United States Patent
Hori et al.

[11] Patent Number: 6,162,142
[45] Date of Patent: Dec. 19, 2000

[54] DRIVE APPARATUS FOR SUNROOF

[75] Inventors: Kenji Hori, Chiryu; Katsuaki Kadoike, Kariya, both of Japan

[73] Assignee: Aisin Seiki Kabushiki Kaisha, Kariya, Japan

[21] Appl. No.: 09/120,187

[22] Filed: Jul. 22, 1998

[30]     Foreign Application Priority Data

Jul. 23, 1997  [JP]  Japan .................................. 9-197490

[51] Int. Cl.⁷ .................................................. B60J 7/057
[52] U.S. Cl. ............................................ 475/149; 296/223
[58] Field of Search ........................... 296/223; 475/162, 475/149, 158, 254

[56]             References Cited

U.S. PATENT DOCUMENTS 5,566,593  10/1996  Vordermaier ............................ 296/223
  5,773,947   6/1998  Torii et al. ............................... 296/223
  5,791,204   8/1998  Torii et al. ............................... 296/223
  5,823,905  10/1998  Torii et al. ............................... 475/149

FOREIGN PATENT DOCUMENTS 4-138917   5/1992  Japan .
  5-292771  11/1993  Japan .
  7-71166    3/1995  Japan .
  7-21418    4/1995  Japan .

*Primary Examiner*—Dirk Wright
*Attorney, Agent, or Firm*—Burns, Doane, Swecker & Mathis, LLP

[57]            ABSTRACT

A drive apparatus for a sunroof comprises a rotation output shaft connected to a drive source through a first reduction gear and adapted to connect to a driven member of the sunroof and a detecting mechanism arranged on the same axis of that of the rotation output shaft and detecting a moving position of a sunroof panel in synchronous with a rotation of a rotating plate connected to the rotation output shaft through a second reduction gear.

4 Claims, 8 Drawing Sheets

DRIVE APPARATUS FOR SUNROOF

BACKGROUND OF THE INVENTION

The present invention relates to a drive apparatus for a sunroof apparatus for a vehicle.

Figure 12:
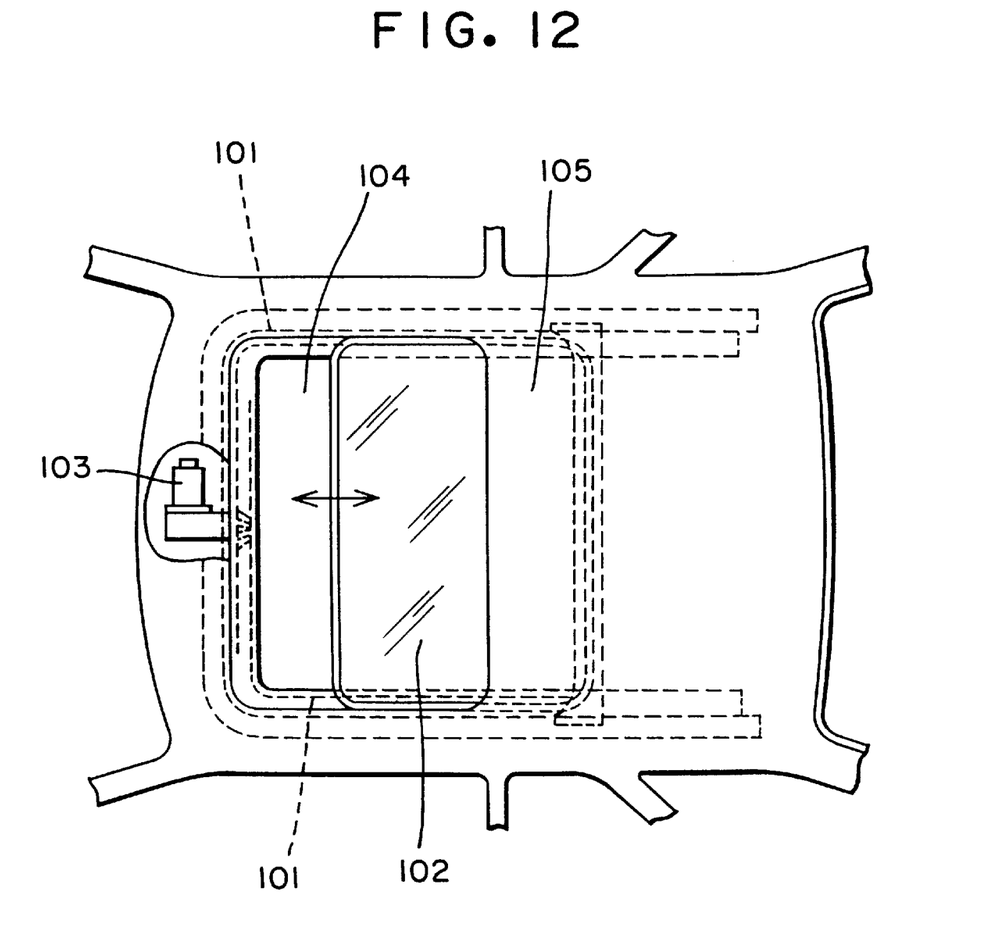
FIG. 12 is a plan view illustrating a sliding type sunroof.

As shown in FIG. 12, a conventional type sliding sunroof includes rails 101 secured to a vehicle's body, and a sunroof panel 102 adapted to be slid along the rails 101 by an operation of a drive apparatus 103 to open or close an opening 104 of a roof 105. A driving power from the drive apparatus is transmitted to the sunroof panel 102 through a driven mechanism thereof.

Conventionally, as this kind of the drive apparatus for the sunroof, there has been known a structure shown in Japanese Patent Laid-Open Publication No. Hei 4-138917 (1992) and Japanese Utility Model Laid-Open Publication No. Hei 7-21418 (1995).

Both the conventional apparatuses are structured such as to have a rotary output shaft to which an output gear of a drive means is secured through a first reduction gear, and a detecting mechanism for detecting a moving position of the driven mechanism in synchronous with a rotation of the output shaft. The rotary output shaft is connected to the sunroof panel through the driven mechanism. The driven mechanism has a rotatable shaft separated or branched from the first reduction gear, and a second reduction gear disposed between the rotatable shaft and the first reduction gear.

The second reduction gear in the former conventional apparatus is constituted by a planetary gear structure comprising an internal gear and an external gear meshed with the internal gear and having a number of gear teeth which is one or more less than that of the internal gear, and the detecting mechanism is constituted such as to have a cam plate connected to the external gear by a plurality of cylindrical projecting portions and a plurality of hole portions to which the cylindrical projecting portions are loosely fitted, and a plurality of limit switches capable of being in contact with the cam plate.

The second reduction gear in the latter conventional apparatus is constituted by a planetary gear structure comprising a plurality of spur gears meshed with each other, and the detecting mechanism is constructed such as to have a contact element fixed to a final spur gear of the second reduction gear and an electrically conductive pattern member capable of being in electrical contact with the contact element in accordance with a rotation of the final spur gear.

However, in the conventional apparatus mentioned above, since the detecting mechanism has the shaft which is branched from the first reduction gear through the second reduction gear, the detecting gear is arranged on the different axis from the axis of the output gear. Accordingly, the apparatus itself is made large, and becomes disadvantageous in view of a space. Further, in the former conventional apparatus, since the limit switch is used for the detecting mechanism, especially, the apparatus is made large in a thickness direction, and further, in the latter conventional apparatus, since a plurality of spur gears are used for the second reduction gear, especially, the apparatus is made large in a plane direction.

SUMMARY OF THE INVENTION

Accordingly, an object of the present invention is to provide a compact drive apparatus for a sunroof.

In order to achieve the object mentioned above, in accordance with the present invention, there is provided a drive apparatus for a sunroof comprising: a rotation output shaft to which an output gear connected to a drive source through a first reduction gear and connected to a driven member of the sunroof is adhered; and a detecting mechanism arranged on the same axis of that of the rotation output shaft and detecting a moving position of the driven member in synchronous with a rotation of the rotation output shaft connected to the rotation output shaft through a second reduction gear.

In accordance with this technical means, the output gear and the detecting mechanism are coaxially arranged around the rotation output shaft. Accordingly, the drive apparatus for the sunroof can be made more compact than the conventional one.

More preferably, the second reduction gear is constituted by a planetary gear structure comprising an internal gear and an external gear meshed with the internal gear and having a number of gear teeth which is one or more less than that of the internal gear, and the detecting mechanism is structured such as to have a rotating plate connected to the external gear by a plurality of cylindrical projecting portions and a plurality of hole portions to which the cylindrical projecting portions are loosely fitted, a contact element fixed to the rotating plate and a conducting pattern member capable of being in electrical contact with the contact element in accordance with a rotation of the rotating plate.

More preferably, a housing for receiving the first reduction gear, the second reduction gear and the detecting mechanism is provided, and a receiving recess portion having the rotation output shaft as an axial core and forming the internal gear is formed in the housing. The conducting pattern member, the rotating plate and the external gear are arranged within the receiving recess portion in a layered manner, and a cap member engaging with the housing prevents coming off in an axial direction.

DESCRIPTION OF THE PREFERRED EMBODIMENTS

Figure 1:
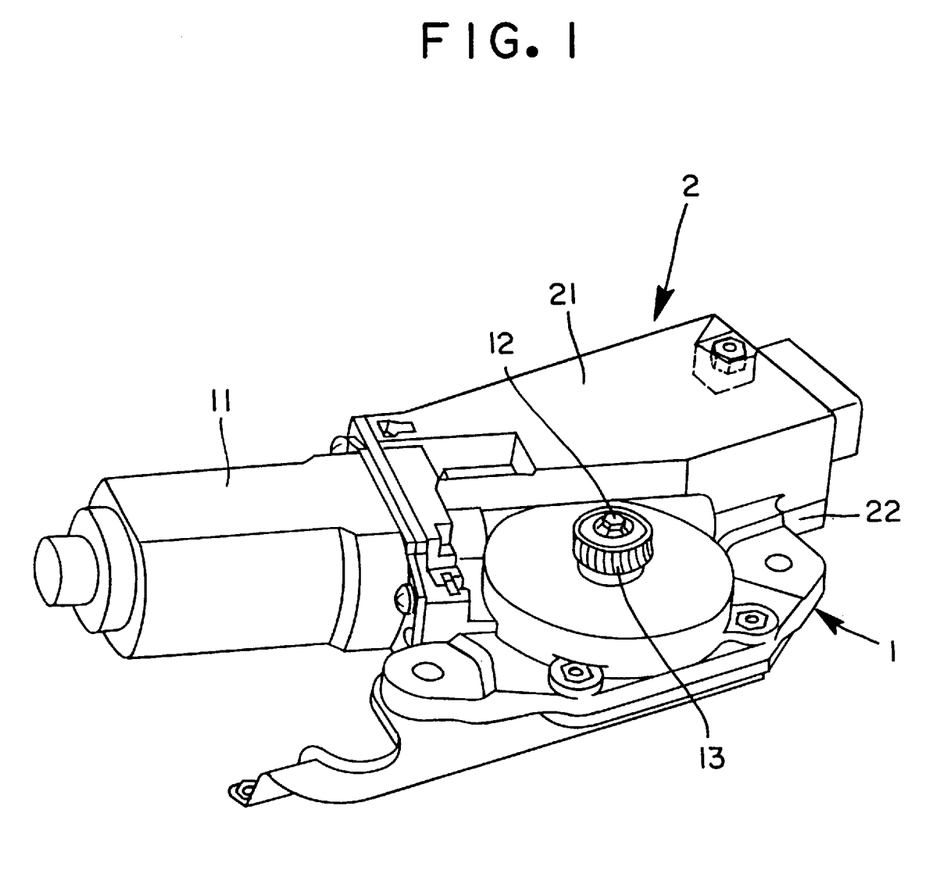
FIG. 1 is a totally perspective view of a drive apparatus for a sunroof in accordance with the invention.
Figure 2:
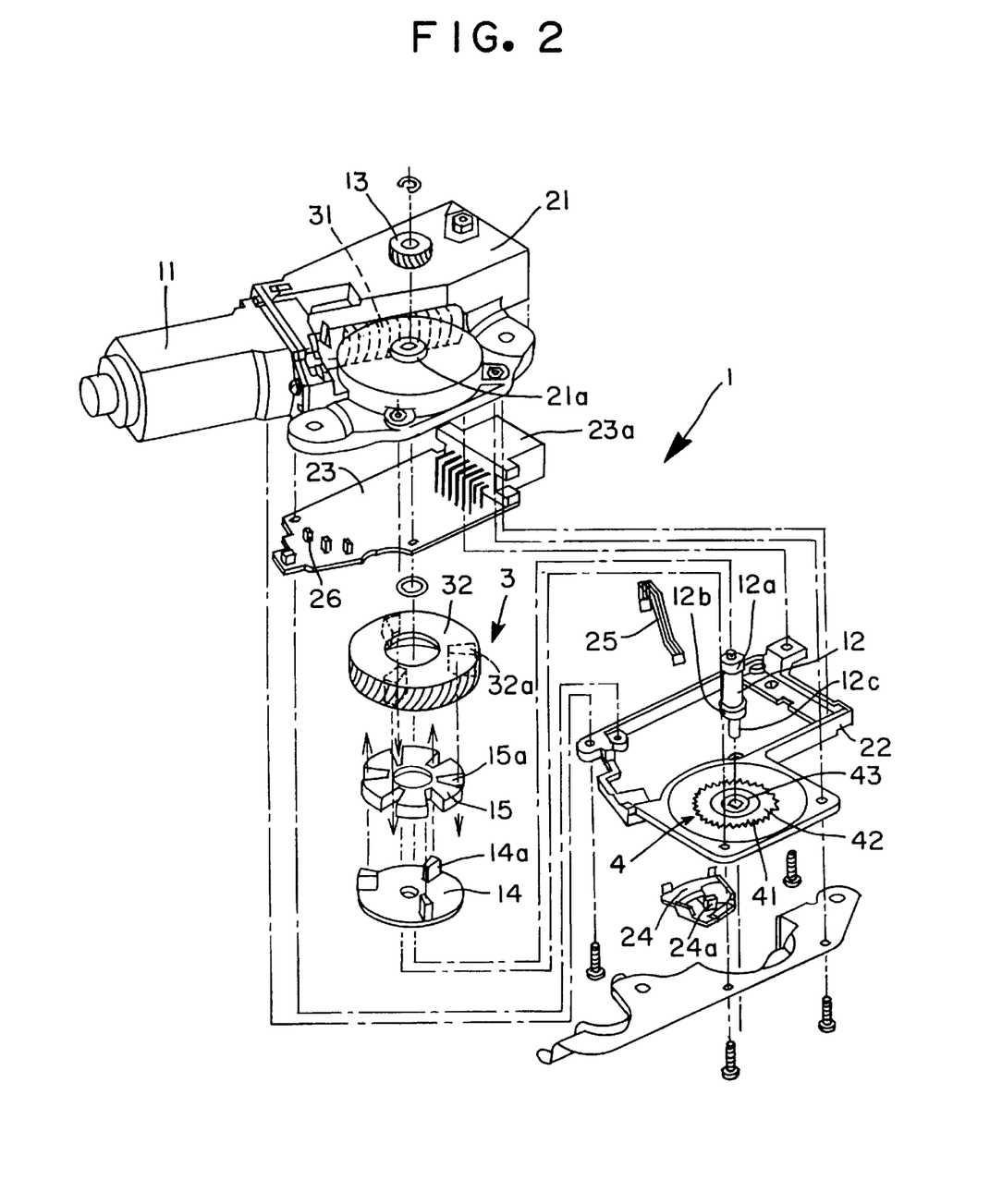
FIG. 2 is an exploded perspective view of a drive apparatus for a sunroof in accordance with the invention.
Figure 3:
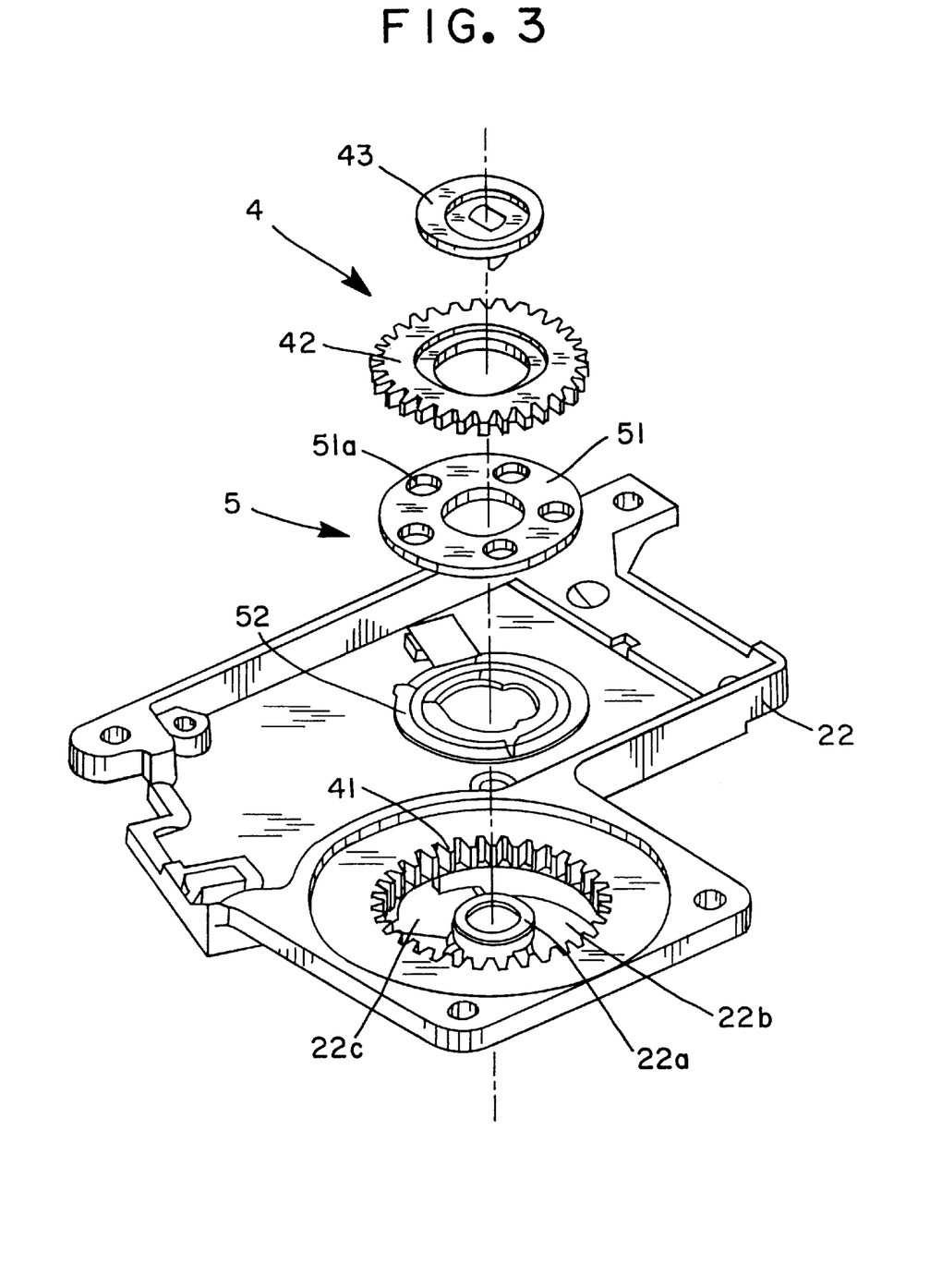
FIG. 3 is an exploded perspective view which shows a detecting mechanism of a drive apparatus for a sunroof in accordance with the invention.

As shown in FIGS. 1 to 3, a drive apparatus 1 substantially corresponding to the drive apparatus 103 in FIG. 12 is constructed such as to slide a sunroof panel 102 (in FIG. 12) of a so-called sunroof apparatus for opening and closing an opening 104 (in FIG. 12) formed on a vehicle roof by a motor 11 as a drive source in an opening direction and a closing direction, and to mesh an output gear 13 secured to a rotation output shaft 12 thereof with a geared cable (not shown) connected to the sunroof panel. The drive apparatus 1 is mainly constituted by a first reduction gear 3, a second reduction gear 4 and a detecting mechanism 5 received within a housing 2.

The housing 2 is constituted by a box-like case 21 and a cover 22 closing an opening of the case 21. The rotation output shaft 12 is rotatably supported on the case 21 and the cover 22 at both ends thereof by supporting portions 21a and 22a in such a manner as to transverse the receiving space within the housing 2. An end of the rotation output shaft 12 extends through the case 21 out of the housing 2, and an output gear 13 is secured to the one end by a serration connection portion 12a in such a manner as to integrally rotate.

A worm gear 31 is arranged to the rotating axis of the motor 11 in such a manner as to integrally rotate. A worm wheel gear 32 is supported to the rotation output shaft 12 in such a manner as to freely rotate with each other. The worm gear 31 and the worm wheel gear 32 are mutually meshed with each other, and constitute the first reduction gear 3. Further, a damper plate 14 is secured to the other end of the rotation output shaft 12 by a key connection 12b having opposed flat surfaces in such a manner as to integrally rotate, and the worm wheel gear 32 is connected to the damper plate 14 through a damper rubber 15. As shown in FIG. 2, the damper plate 14 has three projections 14a which extend upwardly into notches 15a formed on the damper rubber 15. Projections 32a of the worm wheel gear 32 extend downwardly into the notches 15a. Thus, the rotation of the worm wheel gear 32 is transmitted to the damper plate 14 through the damper rubber 15 so that the rotation output shaft 12 is rotated by the damper plate 14. Accordingly, a rotating operation of the motor 11 is reduced in a speed by a meshing between the worm gear 31 and the worm wheel gear 32 so as to rotate the rotation output shaft 12 through the damper rubber 15 and the damper plate 14, thereby being output from the output gear 13. As a result, the sliding panel moves along the opening of the roof due to the rotation of the output gear 13 from a slide state or a tilt open state to a closed state, or from the closed state to the slide state of the tilt open state.

As shown in FIGS. 1 to 3, a receiving recess portion 22b is formed around the supporting portion 22a for the rotation output shaft 12 in the cover 22. An internal gear 41 is formed on a side wall of the receiving recess potion 22b. An external gear 42 is supported to the rotation output shaft 12 through a cap member 43 in such a manner as to freely rotate with respect to the rotation output shaft 12. A number of gear teeth of the external gear 42 is one tooth less than that of the internal gear 41, and is meshed with the external gear 42, so that the second reduction gear 4 is constituted by the external gear 42 and the internal gear 41. The cap member 43 is secured to the other end of the rotation output shaft 12 by a key connection 12c having opposed flat surfaces in such a manner as to integrally rotate, and the external gear 42 is supported to the cap member 43 by an eccentric portion 43a formed in the cap member 43 so as to freely rotate with each other.

Figure 4:
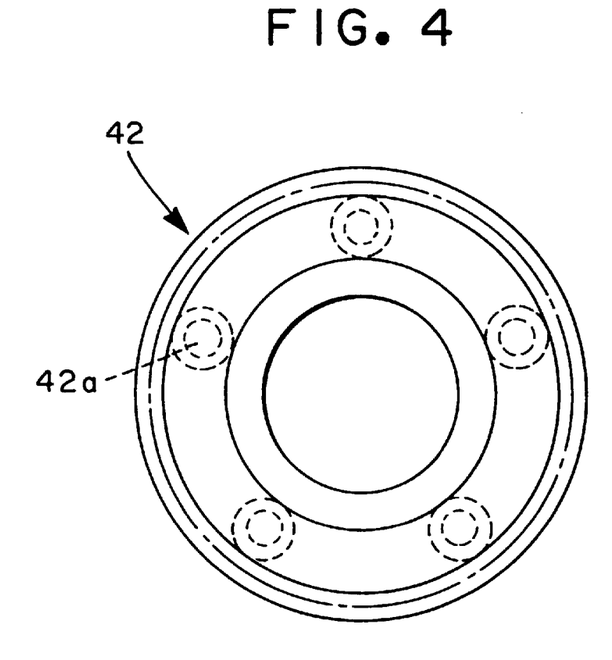
FIG. 4 is a plan view which shows an external gear of a second reduction gear in a drive apparatus for a sunroof in accordance with the invention.
Figure 5:
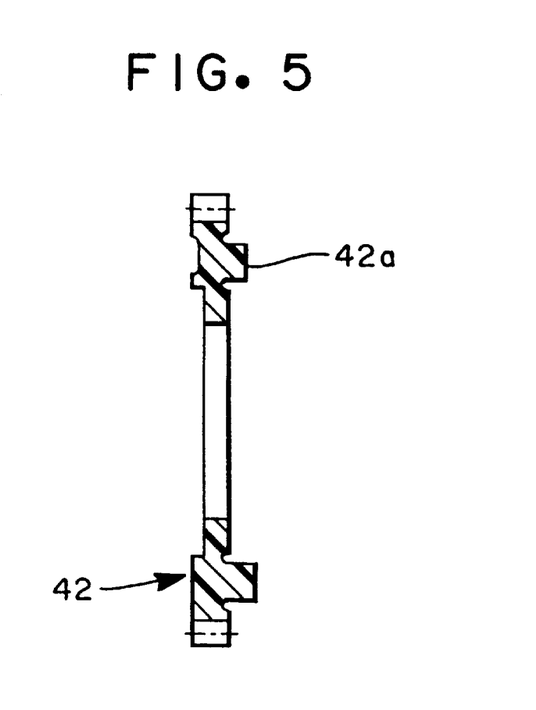
FIG. 5 is a vertical cross sectional view of FIG. 4.

Accordingly, a rotation of the rotation output shaft 12 is widely reduced a speed by a planetary motion of the external gear 42 with respect to the internal gear 41 due to a meshing between the internal gear 41 and the external gear 42, thereby rotating the external gear 42. Further, as shown in FIGS. 4 and 5, a plurality of cylindrical projecting portions 42a are formed on a back surface of the external gear 42 at an equal interval.

In addition to the external gear 42, a rotating plate 51 and a switch plate 52 are housed within the receiving recess portion 22b around the supporting portion 22a in the order of the switch plate 52, the rotating plate 51 and the external gear 42.

Figure 6:
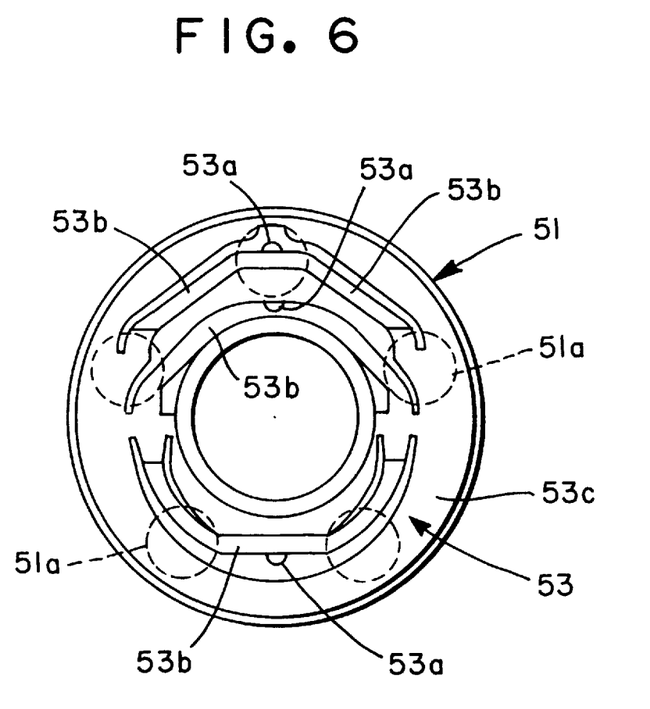
FIG. 6 is a plan view which shows a rotating plate of a detecting mechanism in a drive apparatus for a sunroof in accordance with the invention.
Figure 7:
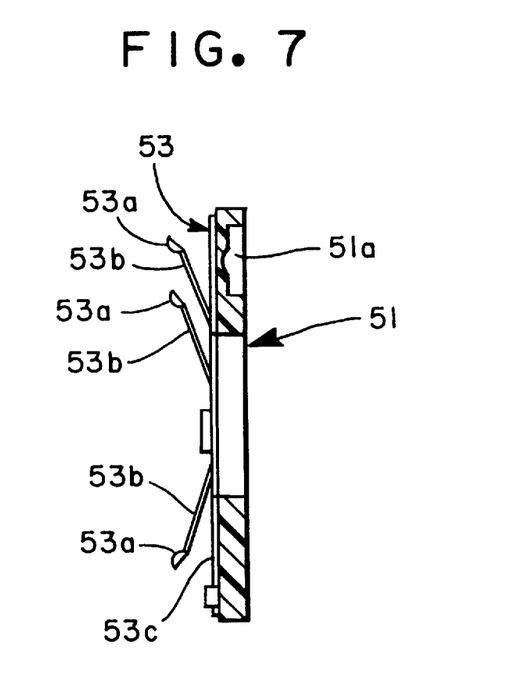
FIG. 7 is a vertical cross sectional view of FIG. 6.

As shown in FIGS. 6 and 7, a plurality of hole portions 51a are formed on a back surface of the rotating plate 51 at an equal interval, and a contact 53 is fixed to the back surface.

Figure 8:
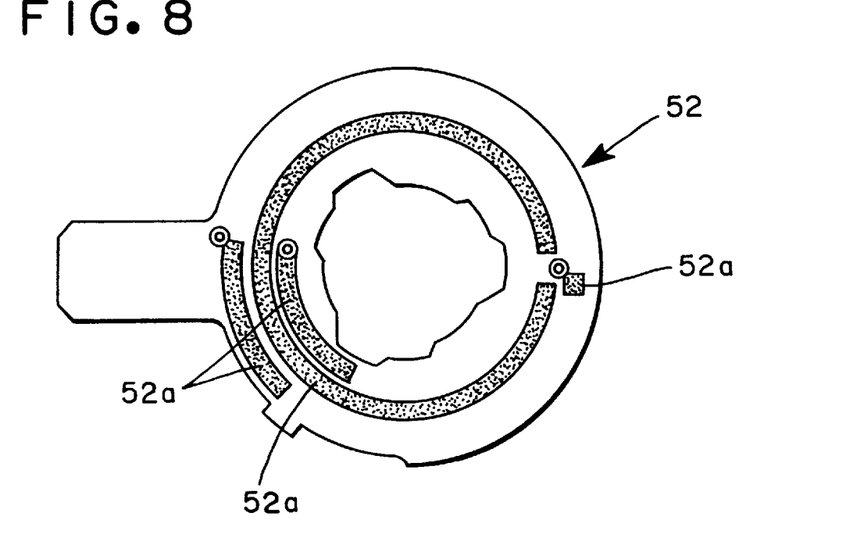
FIG. 8 is a plan view which shows a conducting pattern member of a detecting mechanism in a drive apparatus for a sunroof in accordance with the invention.

As shown in FIG. 8, a conducting portion 52a formed in a predetermined shape is formed on the back surface of the switch plate 52. The rotating plate 51 is disposed below the external gear 42, and the cylindrical projecting portion 42a of the back surface of the external gear 42 is loosely fastened to the hole portion 51a of the surface thereof. Further, the switch plate 52 is disposed below the rotating plate 51, and a contact 53 of the back surface of the rotating plate 51 is slidably in contact with the conducting portion 52a of the surface thereof. The rotating plate 51, the switch plate 52 and the contact 53 constitute the detecting mechanism 5.

Accordingly, a rotation of the external gear 42 is transmitted to the rotating plate 51 by a loose fitting between the cylindrical projecting portion and the hole portion 51a, and the rotating plate 51 rotates in synchronous with the rotation output shaft 12 or the worm wheel gear 32. As a result, the contact 53 and the conducting portion 52a are slidably in contact with each other so as to switch a conducting pattern of the conducting portion 52a.

In this case, a rotation of the rotating plate 51 is set to be within a rotation while the opening portion changes from the slide state or the tilt open state to the closed state, or from the closed state to the slide state or the tilt open state in accordance with a movement of the sunroof panel, whereby the detecting mechanism 5 changes the conducting pattern for plural times while the opening of the roof changes from the open state to the closed state or from the closed state to the open state in accordance with a movement of the sunroof panel, and detects the moving position of the sunroof panel.

As shown in FIG. 3, an opening window 22c is formed on a bottom wall of the receiving recess portion 22b in the cover 22. The opening window 22c exposes an inner portion of the receiving recess portion 22b, and facilitates an initial positioning operation between the contact 53 and the conducting portion 52a at a time of assembling the rotating plate 51 and the switch plate 52 and an electrical connecting operation between a drive circuit substrate 23 and the switch plate 52 mentioned above. The opening window 22c is formed such as to be closed by a cover body 24 (refer to FIG. 2), and the switch plate 52 is structured such as to be held at an initial position positioned by a flange portion 24a formed in the cover body 24.

Figure 9:
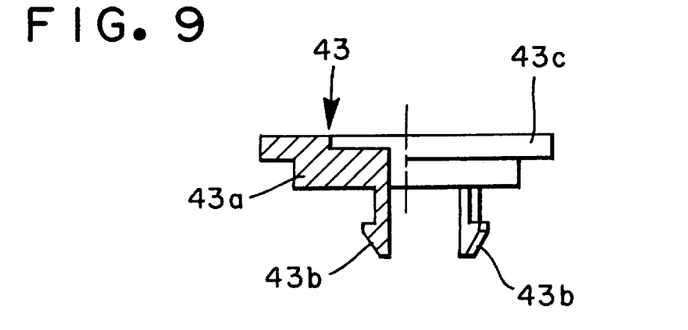
FIG. 9 is a plan view which shows a cap member of a detecting mechanism in a drive apparatus for a sunroof in accordance with the invention.
Figure 10:
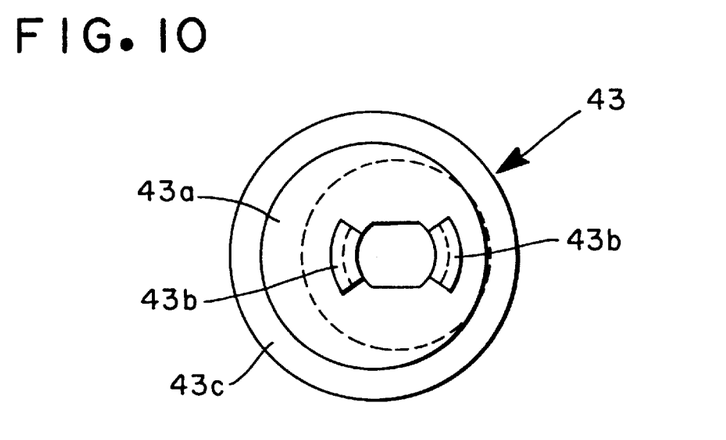
FIG. 10 is an upper elevational view of FIG. 9.
Figure 11:
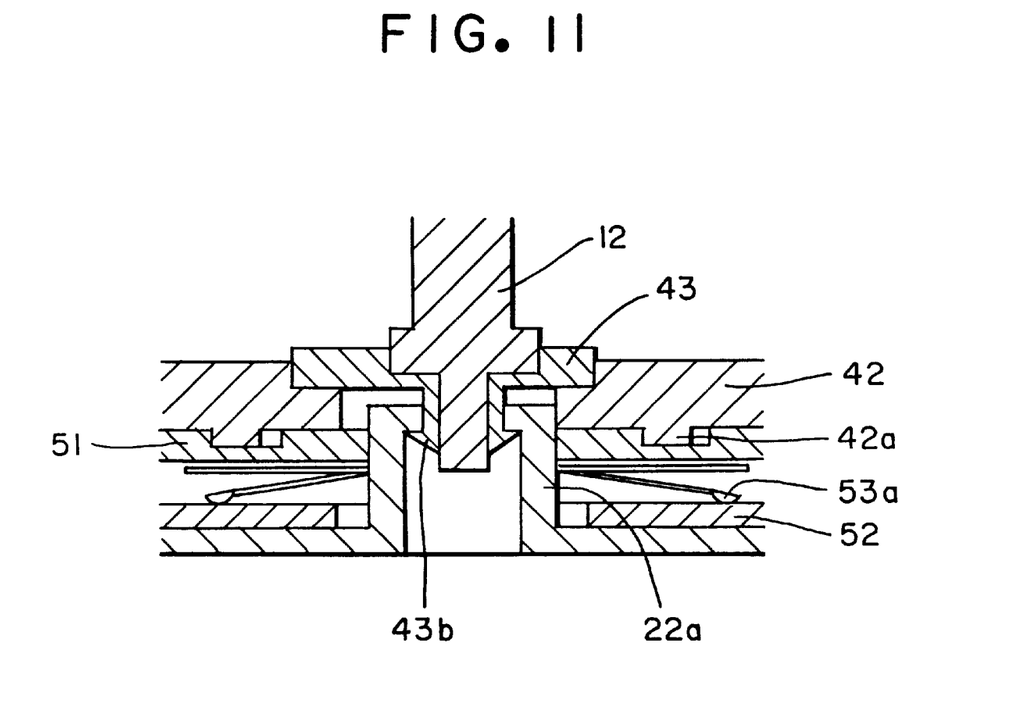
FIG. 11 is a section which shows a relation of engaging portions and a supporting portion of a cover.

As shown in FIGS. 9 and 10, an engaging hook 43b freely and relatively rotating with the supporting portion 22a of the cover 22 and engaging in an axial direction so as not to move is formed in the cap member 43. Further, a flange portion 43c brought into contact with the surface of the external gear 42 is formed in the cap member 43 in an continuous manner from the eccentric portion 43a. The cap member 43 is pressed to the supporting portion 22a of the cover 22 in a state that the switch plate 52, the rotating plate 51 and the external gear 42 are received within the receiving recess portion 22b of the cover 22, and serves as a coming-off prevention member in an axial direction for the received rotating plate 51, switch plate 52 and external gear 42 by engaging the engaging hook 43b with the supporting portion 22a and bringing the flange portion 43c into contact with the surface of the external gear 42.

As shown in FIGS. 6 and 7, the contact 53 is formed by cutting up a part of a metal thin plate having the same shape as that of the rotating plate 51, and is provided with a plurality of contact portions 53a which can slidably contact with the conducting portion 52a of the switch plate 52. The contact points 53a are respectively connected to mounting portions 53c by a plurality of arm portions 53b, an arranging structure disperses and lightens a load applied to the mounting portion 53c and restricts an incline of the rotating plate 51 with respect to the switch plate 52.

As shown in FIG. 2, the housing 2 is provided with a drive circuit substrate 23. The drive circuit substrate 23 is constructed such as to be connected to the motor 11 and control an operation of the motor 11, and is disposed in such a manner as to be held between the case 21 and the cover 22, and the cover 22 and the case 21 are screwed, and further, an external connector 23a electrically connected to a power source (not shown) such as a battery for a vehicle is integrally provided. Further, the drive circuit substrate 23 is connected to the conducting portion 52a of the switch plate 52 by a lead wire 25, and further, a Hall IC 26 detecting a rotational speed of the motor 11 is connected thereto.

Accordingly, the drive circuit substrate 23 controls an operation of the motor 11 on the basis of the sunroof panel position signal from the switch plate 52 and a pulse signal from the Hall IC 26. In this case, the Hall IC 26 is not always necessary, the structure can be made to be controlled only by the movable panel position signal from the switch plate 52. Further, the movable panel position signal generated by the switch plate 52 is defined on the basis of the conducting pattern of the conducting portion 52 in the switch plate 52 and a switching of the conducting pattern (an edge detection).

In this case, in an connection between the external gear 42 of the second reduction gear 4 and the rotating plate 51 of the detecting mechanism 5 in accordance with the embodiment mentioned above, the structure may be made such that the hole portion is formed in the external gear 42 and the cylindrical projecting portion loosely fitted to the hole portion is formed on the rotating plate 51, respectively. Further, the eccentric portion 43a of the cap member 43 may be made an eccentric portion formed on the rotation output shaft 12. Still further, the drive circuit substrate 23 and the switch plate 52 may be united.

In accordance with the invention, since the detecting mechanism is arranged on the same axis as the rotation output shaft to which the output gear is secured, the apparatus is wholly made compact in comparison with the conventional one. Further, a number of the parts can be reduced, and a cost therefor can be advantageous.

Further, in accordance with the invention, since the second reduction gear is constituted by a planetary gear mechanism and the detecting mechanism is constituted by using the conducting pattern member, the apparatus can be made compact especially in a plane direction and a thickness direction.

Still further, in accordance with the invention, since the detecting mechanism and the second reduction gear are received within the receiving recess portion of the housing by layering in an axial direction, it is easy to unit them and an assembling operation can be made simple.

As many apparently widely different embodiments of the present invention can be made without departing from the spirit and scope thereof, it is to be understood that the invention is not limited to the specific embodiments thereof except as defined in the appended claims.

What is claimed is:

1. A drive apparatus for a sunroof comprising:

a housing;

source having a first reduction gear;

a rotation output shaft rotated by an output of said first reduction gear and adapted to co-operate with a driven mechanism of the sunroof;

a second reduction gear arranged in said housing on the same axis as said rotation output shaft and connected thereto, said second reduction gear including an internal gear formed in said housing and an external gear arranged within the internal gear and meshing with the internal gear, said external gear having a number of gear teeth which is at least one less than the number of gear teeth of the internal gear; and a detecting mechanism arranged in said housing on the same axis as said rotation output shaft and adapted to detect a moving position of said driven mechanism, said detecting mechanism including a rotating plate connected to said external gear through a plurality of hole portions formed on one of said external gear and said rotating plate and a plurality of projecting portions formed on the other of said external gear and said rotating plate, with said projecting portions being loosely positioned in the hole portions, a contact element fixed to said rotating plate and a conducting pattern member opposed to said contact element and adapted to electrically contact the contact element in accordance with a rotation of said rotating plate.

2. A drive apparatus for a sunroof according to claim 1, further comprising a receiving recess portion formed on said housing for receiving one end of said rotation output shaft, said rotating plate and said external gear being arranged within said receiving recess portion in a layered manner, and a cap member engaging with said external gear and the rotation output shaft to prevent the layered members said coming off in an axial direction.

3. A drive apparatus for a sunroof comprising:

a casing adapted to be secured to a body of a vehicle roof;

an electric motor supported on said casing;

a first reduction gear housed in said casing for reducing a speed of rotation of said electric motor;

a rotation output shaft passing through an axis of said first reduction gear and rotatably supported at its ends on said casing, said rotation output shaft being rotated by said first reduction gear and adapted to transmit the reduced rotation to a sliding mechanism of said sunroof;

a second reduction gear arranged in co-axial relation with said rotation output shaft and housed in said casing, said second reduction gear receiving the rotation of said rotation output shaft;

a rotating plate associated with said second reduction gear to receive a reduced rotation therefrom; and a detecting means for detecting an amount of rotation of said rotating plate to determine the position of the sunroof, said second reduction gear including an eccentric cap member fixed to said rotation output shaft, an external gear associated with said cap member to be rotated by said rotation output shaft and rotatably supported on said rotation ouput shaft through said cap member, and an internal gear formed on said casing in meshing engagement with said external gear of which the number of teeth is at least one less than those of said internal gear, said rotating plate being rotated integral with said external gear, said cap member having means for preventing said external gear and said rotating plate from slipping off in an axial direction.

4. A drive apparatus for a sunroof according to claim 3, wherein said rotating plate is connected to said external gear by a plurality of cylindrical projecting portions and corresponding hole portions in which said cylindrical projecting portions are fitted, said rotating plate having said hole portions or said cylindrical projecting portions and said external gear having said cylindrical projecting portions or said hole portions.

* * * * *